(12) United States Patent
Churchill et al.

(10) Patent No.: US 6,886,306 B2
(45) Date of Patent: May 3, 2005

(54) FIRE-RESISTANT MATERIAL AND METHOD OF MANUFACTURE

(75) Inventors: Christopher S. Churchill, Sacramento, CA (US); Charles V. Likes, Yuba City, CA (US); Theodore J. Bauer, Central Point, OR (US)

(73) Assignee: Greencor Composites, LLC, Sacramento, CA (US)

( * ) Notice: Subject to any disclaimer, the term of this patent is extended or adjusted under 35 U.S.C. 154(b) by 0 days.

(21) Appl. No.: 09/848,792

(22) Filed: May 4, 2001

(65) Prior Publication Data

US 2002/0162298 A1 Nov. 7, 2002

(51) Int. Cl.$^7$ .............................. E04C 2/10; E04C 2/16
(52) U.S. Cl. .................................. 52/784.11; 52/787.11
(58) Field of Search .................. 52/783.13, 784.11, 52/787.11

(56) References Cited

U.S. PATENT DOCUMENTS

| | | | | |
|---|---|---|---|---|
| 4,104,828 A | * | 8/1978 | Naslund et al. | 49/399 |
| 4,154,030 A | | 5/1979 | Huguet | 52/98 |
| 4,380,568 A | | 4/1983 | Masuda et al. | 428/276 |
| 5,498,469 A | | 3/1996 | Howard et al. | 428/218 |
| 5,730,830 A | * | 3/1998 | Hall | 156/468 |
| 5,749,954 A | | 5/1998 | Law et al. | 106/282 |
| 5,887,402 A | * | 3/1999 | Ruggie et al. | 52/455 |
| 5,932,038 A | | 8/1999 | Bach et al. | 156/62.2 |
| 6,115,976 A | * | 9/2000 | Gomez | 52/232 |
| 6,309,492 B1 | * | 10/2001 | Seidner | 156/94 |
| 6,346,165 B1 | * | 2/2002 | Markessini et al. | 156/296 |
| 6,434,899 B1 | * | 8/2002 | Fortin et al. | 52/232 |
| 6,528,175 B2 | * | 3/2003 | Grantham et al. | 428/541 |

FOREIGN PATENT DOCUMENTS

| | | | | |
|---|---|---|---|---|
| CN | 1212957 A | | 4/1999 | ............ C04B/28/00 |
| DE | 3902023 A1 | * | 7/1990 | ............ B27N/3/00 |
| WO | WO 9934925 | * | 7/1999 | ............ B02C/19/12 |
| WO | WO 02059433 A2 | * | 8/2002 | |

OTHER PUBLICATIONS

The Rice Straw Demonstration Project Fund ☐☐Proposed Grant Awards for Fiscal Year 1998–99 ☐☐Presented for the California Air Resources Board's Consideration On Apr. 22, 1999.*
Envior Board Corporation.*
Sacramento Business Journal, Jun. 22, 2001 print edition, Investors aim to trun rice straw into fiberboard, Celia Lamb (staff writer).*
Rice Straw Products Resource List, Building Materials, Web page updated Nov. 15, 2001.*

* cited by examiner

Primary Examiner—Brian E. Glessner
(74) Attorney, Agent, or Firm—Gardere Wynne Sewell LLP

(57) ABSTRACT

The present invention provides a building material derived from straw, such as rice straw, that has significantly improved fire-resistance properties over traditional cellulose-based materials. In one embodiment, the invention provides a method of fabricating a board from milled rice straw. The milled rice straw is blended with a binder to form a mixture. The mixture is then formed into a mat with sufficient size to achieve a predetermined board thickness and density. The mat is then pressed into the board. In another embodiment, the present invention provides a fire resistant board that includes milled rice straw, a resin binder, and a fire retardant material such as an organic phosphate, zinc borate, aluminum trihydrate, sodium silicate, or even rice hulls.

13 Claims, 2 Drawing Sheets

FIRE-RESISTANT MATERIAL AND METHOD OF MANUFACTURE

TECHNICAL FIELD OF THE INVENTION

The present invention relates generally to the field of building materials in general, and in particular to the introduction of straw, such as rice straw, as a means of increasing the fire retardant qualities of such materials.

BACKGROUND OF THE INVENTION

Straw is the above ground part of cereal and grass seed plants remaining after the grain or grass seed has been removed. Species of cereals and grasses providing straw include wheat, rice, rye, oats, barley, fescue, annual and perennial ryegrass, bluegrass and bentgrass. Although straw has been available in substantial quantities since the dawn of agriculture, only recently have straw-based cellulosic materials been considered suitable for use in modern building materials. In many areas, the use of straw as a building material was not permitted due to a common perception that straw is an inherently inferior building material. Unlike wood-based cellulosic materials, which have been used successfully for centuries, straw has not generally been considered useful because of the perception that straw lacked strength, durability, or fire retardance.

Contrary to conventional wisdom, however, recent experience with straw as a building material has shown that, employed correctly, straw can be used very effectively in modern construction. One current method of the use of straw in construction involves the incorporation of entire straw bales into the walls of a house. Experience with this method has shown that sufficiently dense packing and size can provide the necessary strength and structural support required for home construction.

Another current straw-based building material is a thin panel of compressed straw combined with a resin binder. Such panels have been shown to be useful as a core layer or core stock in a plywood laminate. These panels are then incorporated with stronger wood laminate layers for the production of plywood. The cellulose fibers used in the production of the plywood may be derived from pulp, waste paper, spoiled paper, pulp sludge, linter, bagasse, and other such materials in addition to those derived from straw.

There remains the problem, however, with the inherent flammability of cellulose-based materials. Traditional cellulose-based flame retardant materials have inherent drawbacks owing to the fire-retardant additives incorporated therein. For example, an addition of 15 to 25% borate or boric acid can be added to the cellulosic stock to make the material flame retardant. The inclusion of these fire-retardant additives renders the material highly hydroscopic, or water-absorptive. In addition, these materials tend to absorb more moisture over the course of time, which can cause significant dimensional changes in structures built with such materials.

Other additives are known to improve the fire retardance of cellulose-based materials, including condensed ammonium phosphate. During processing, these chemicals are generally added to the composition before thermal curing, causing the chemical to react with or adhere to the surface of the molecules and fibers of cellulose. Although some of these materials have reduced water absorption characteristics as compared to materials using borate, concerns over the additive and waste material costs, including disposal costs, make the use of large quantities of such additives undesirable.

Furthermore, these chemical additives have not demonstrated a sufficient improvement in the fire retardance of cellulose-based materials to justify the use of these fire-retardant materials in high-risk and industrial environments. For example, these fire-retardant materials have not had sufficient fire resistance to qualify for ratings at the higher end of the classifications, such as the "45 minute" rating for doors.

Accordingly, there is a need for an inexpensive, relatively lightweight fire-retardant building material capable of qualifying for the higher end fire resistance classifications which is not excessively water absorptive, and which does not require large quantities of chemical additives for its manufacture.

SUMMARY OF THE INVENTION

The following summary of the invention is provided to facilitate an understanding of some of the innovative features unique to the present invention, and is not intended to be a full description. A full appreciation of the various aspects of the invention can be gained by taking the entire specification, claims, drawings, and abstract as a whole.

The use of straw and other waste materials as a substantial constituent of construction materials provides significant benefits with respect to both economy and ecology. Straw, as a by-product of food production, has traditionally been viewed as a waste material with no commercial value. In fact, it was not uncommon to burn straw as a means of disposing of it. But an increasing concern for the environment has meant that burning of such materials has become a much less attractive option, and has been banned in many areas.

The present invention provides a building material derived from straw, such as rice straw, which has significantly improved fire-resistance properties over traditional straw-based materials. The present invention uses straw, such as rice straw, in the place of comparable cellulosic materials to provide a material having a much higher level of fire resistance. The increased fire resistance of the material is significant enough that the volume of fire-resistance additives required can be reduced or even eliminated in some cases. In various embodiments, a fire retardant panel according to the present invention may be incorporated into a fire door capable of qualifying as a 45-minute, 60-minute, or 90-minute door, all of which are higher performance levels than previously available with prior designs.

In one embodiment, the invention provides a method of fabricating a board from milled straw. The milled straw is blended with a binder to form a mixture. The mixture is then formed into a mat with sufficient size to achieve a predetermined board thickness and density. The mat is then pressed into the board. In another embodiment, the present invention provides a fire resistant board that includes milled rice straw, a resin binder, and a fire retardant material such as an organic phosphate, zinc borate, aluminum trihydrate, sodium silicate, or even rice hulls. In yet another embodiment, the present invention provides a fire resistant door having an inner door core and a doorframe. The inner door core is made of milled rice straw fiber in a cured resin matrix. The doorframe is made of a fire-resistant material.

The novel features of the present invention will become apparent to those of skill in the art upon examination of the following detailed description of the invention or can be learned by practice of the present invention. It should be understood, however, that the detailed description of the invention and the specific examples presented, while indicating certain embodiments of the present invention, are provided for illustration purposes only because various changes and modifications within the spirit and scope of the invention will become apparent to those of skill in the art from the detailed description of the invention and claims that follow.

BRIEF DESCRIPTION OF THE DRAWINGS

The accompanying figures, in which like reference numerals refer to identical or functionally-similar elements throughout the separate views and which are incorporated in and form part of the specification, further illustrate the present invention and, together with the detailed description of the invention, serve to explain the principles of the present invention.

DETAILED DESCRIPTION OF THE INVENTION

As described above, the present invention provides a building material derived from rice straw which has significantly improved fire-resistance properties over traditional straw-based materials. The present invention uses rice straw in the place of comparable cellulosic materials to provide a material having a much higher level of fire resistance. The increased fire resistance of the material is significant enough that the volume of fire-resistance additives required can be reduced or even eliminated in some cases. In certain embodiments, a fire retardant panel according to the present invention may be incorporated into a fire door capable of qualifying as a 45-minute, 60-minute, or 90-minute door, all of which are higher performance levels than previously available with prior designs. Although the present invention is described in reference to the use of rice straw, the present invention may be practiced using other types of straw, especially those having a relatively high silica content.

Figure 1:
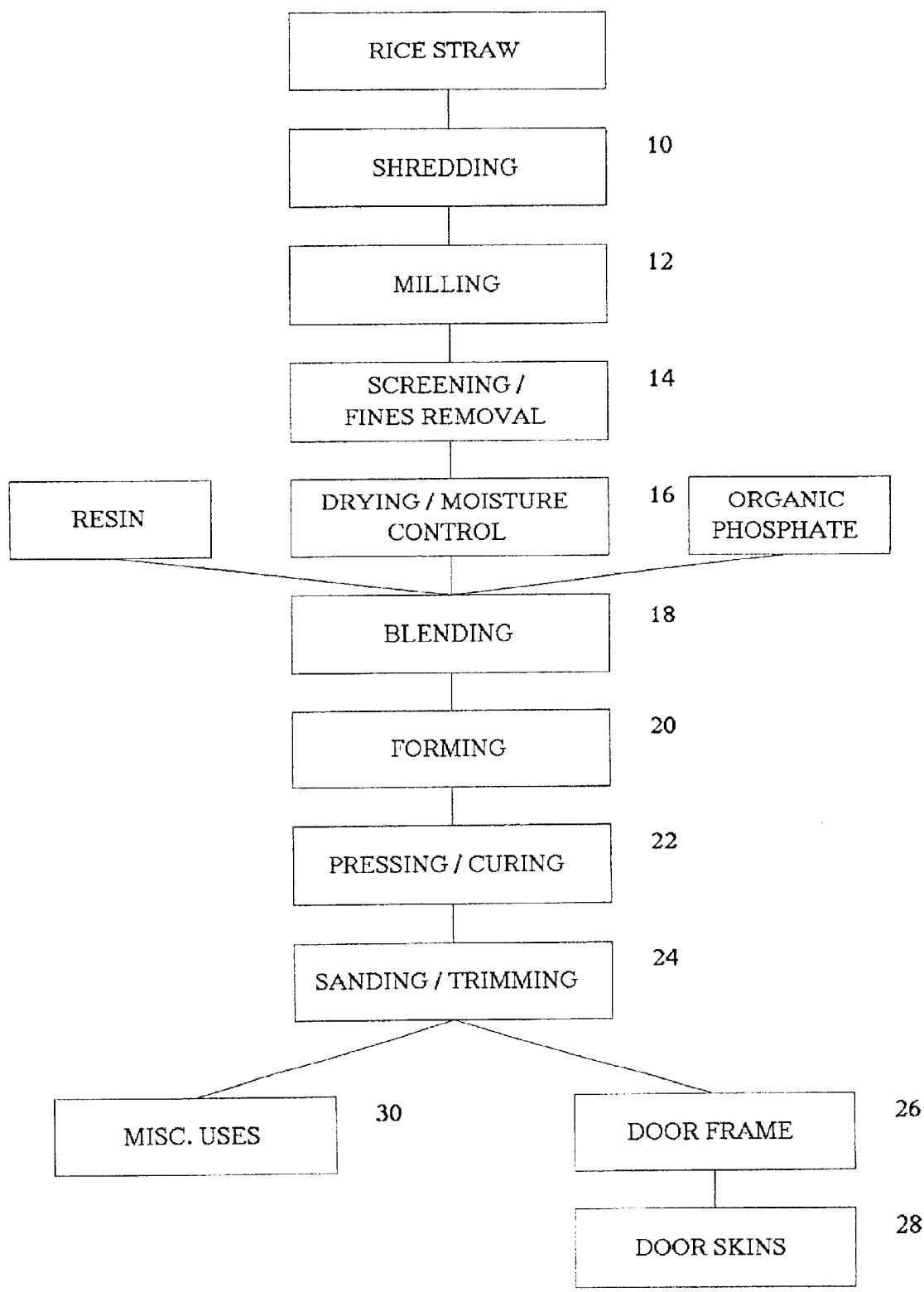
FIG. 1 is a schematic view of the process of manufacture of the rice straw panel of the present invention.

The method of manufacture of the rice straw panel of the present invention is shown schematically in FIG. 1. As can be seen in this figure, rice straw panels manufactured according to the present invention are prepared by first shredding the rice straw bales 10 and milling the rice straw to the desired fiber size range 12. After shredding 10 and milling 12, the milled rice straw may be screened so as to remove fines 14 and dried to a desired moisture content 16. Finally, the milled and dried straw is blended with an uncured resin binder 18, formed into a resin/straw mat of a suitable thickness 20, and cured at a suitable pressure and temperature 22. In certain embodiments, the process further comprises sanding and trimming the cured panel to a desired final thickness 24.

The straw used in the present invention is derived as a by-product of rice production. Transverse cutting or chopping of the rice straw is generally accomplished by using a forage harvester. The cut rice straw is then "baled," combined into easily-manageable bound chunks. After transportation to the processing plant, the straw bales are broken down in a bale shredder. This process is represented in FIG. 1 by block 10.

Although some degree of breakage and cutting of the rice straw stems will generally occur during harvesting, baling, and bale shredding, the straw will usually be too long to be used in preparing the board in accordance with the present invention and will have to be shortened prior to blending. The pieces of straw exiting the bale shredder are generally 0.75 inches or greater in length, and commonly exceed 3 inches. Strands of this length are generally too long to produce boards and must be reduced in size by some form of milling process. The moisture content of the rice straw may or may not be modified prior to milling. For example, milling straw which is too dry may cause thermal deterioration in the cellulose fibers.

The milling process, represented in FIG. 1 by block 12, can be accomplished using any milling device capable of reducing the length of the straw stem, such as a hammermill. The average length of the straw segments recovered from milling can be controlled by selecting appropriate milling conditions. Longitudinal straw cracking/splitting and node crushing can be accomplished by using grooved rollers, such as those found in grain roller mills and hay macerators, by using a sander having shear action, a disk waferizer, a ringflaker, a hammermill, or any other device capable of cutting the rice straw into short segments. The length of the milled straw segments will vary from segment to segment.

The optimum degree of milling and size reduction is determined by making panels and testing for those performance characteristics most desired. In most embodiments of the present invention, the average straw segment size, not including fines, is between approximately 0.125 inches and approximately 1.5 inches, not including fines. In certain embodiments, the milling is performed under conditions designed to minimize the production of fines. But a certain amount of fines may be acceptable as part of the milled straw.

Testing has shown that a certain degree of fines present in the milled straw will not degrade panel performance. If the amount of fines present in the straw after milling is so great as to lower the desired performance characteristics of the panel, the fines may either be partially or substantially removed from the milled straw by screening, aeration, fractionation or other means of classification and separation well known to those skilled in the art. The screening process can be performed either before or after milling, and is represented in FIG. 1 by block 14.

The rice straw may, in certain embodiments, be split to ensure that all surfaces, exterior and interior, of the hollow rice straw stem core are substantially coated with resin prior to curing. In addition, the rice straw may, in certain embodiments, be treated with a solvent wash or other process in such a manner as to strip some or all of the wax on the outside of the stem.

In certain embodiments of the present invention, an intermediate orientation process may be provided by which the majority dimension of the strands of straw are substantially oriented in a parallel fashion. For strands longer than approximately 0.04 inches, a specified degree straw strand orientation control can be achieved with minor modifications to commercially available equipment traditionally used for orienting wood strands. This may also be accomplished by vibrating the strands on a corrugated panel. In certain embodiments, the panel may be tilted. Alternatively, the straw strands can be dropped on parallel vertical bars placed in the form of a spaced grid with a distance less than the strand length. Shaking will then allow the straw to fall through. For strands shorter than approximately 0.04 inches, the straw can be aligned by dropping the strands between vertical oppositely charged electric condenser panels. The dipole on the falling straw particles will align the particles parallel to the electric field.

The drying/moisture control process represented in FIG. 1, block 16 provides a consistent level of quality for any boards produced with the rice straw. In certain embodiments, straw moisture content is controlled to between 3 percent and 8 percent of weight on an oven dry basis. This can be accomplished using any method commonly used in the art for adding and/or removing moisture from materials. Although in certain situations it may be necessary to increase the moisture content of the rice straw, it will generally be necessary to reduce the moisture content of the rice straw in order to bring the moisture content to the proper level. For example, the moisture content may range up to 12 percent by weight of the straw prior to drying.

In some situations, it may be more economical to conduct the drying process in a shorter period of time at a higher temperature rather than at a lower temperature for a longer period of time. In one embodiment of the present invention, the milled rice straw fibers are dried convectionally under hot air at a temperature in the range of from about 200 degrees to 450 degrees Celsius. Depending on the temperature used, the drying time may range between approximately 20 seconds and approximately 10 minutes. Drying may be carried out in any conventional method, using any suitable heating device or devices either alone or in combination, including batch type heat circulators, tunnel type heat circulators, counter current convey type dryers, screw type heat conductive dryers, far-infra red radiation type dryers, and electrically heated rotary dryers.

After drying, the rice straw fiber is blended with a binder (typically a resin binder), as represented in FIG. 1 by block 18. The resin binder may be any binder capable of providing a thin panel having satisfactory performance characteristics. One binder suitable for use in the present invention is a polyisocyanate such as polymeric diphenylmethane diisocyanate, also referred to as MDI (DiphenylMethane Diisocyanate) isocyanate resin. Examples of this type of resin binder are RUBINATE 1840™, a polymethylene polyphenylene ester of isocyanic acid manufactured by ICI™, and PAPI-94™ manufactured by DOW CHEMICAL™. In other embodiments, the resin binder may comprise phenol or a urea formaldehyde. In certain embodiments, the resin binder is added to the mixture at a rate of 2% to 10% of fiber weight on an oven-dried basis. The milled straw weight can be measured by a scale with a feedback control mechanism to regulate the rate at which the binder and the organic phosphate are added.

The blending process can also involve the addition of a fire retardant material such as an organic phosphate, a borate (zinc borate and/or boric acid), sodium silicates, aluminum trihydrate, or even rice hulls. For example, a DPMA (DipropyleneGlycol MonomethylEtherAcetate) extender can be used, such as DOWANOL™ manufactured by DOW CHEMICAL™. Other substances may be added to achieve the desired board properties. One such substance is wax, such as paraffin wax, is used. One example of a wax found to be useful with the current invention is CASCO WAX EW-403 HM™ manufactured by Borden Chemical, Inc. Other substances (chemicals) may be added to prevent the adhesion of the product to manufacturing equipment. One such release agent found to be useful with the current invention is MONO-COAT E304™ manufactured by ChemTrend, Inc.

After blending, the resonated rice straw fiber is then formed into a mat having a thickness and weight suitable for achieving a specified board thickness and density, as represented in FIG. 1 by block 20. The formed mat is then pressed and cured into a panel or board to a thickness usually thicker than the specified finished thickness. The curing process is represented in FIG. 1 by block 22. One example of equipment useful for curing is a hot press. As appreciated by those skilled in the art, the ideal process parameters will vary from one application to another. In one embodiment of the present invention, the resin/straw mat is cured at a pressure ranging between approximately 300 and approximately 500 psi, a temperature of between approximately 250 and approximately 400 degrees Fahrenheit, and for a period of time ranging between approximately one to approximately three minutes.

As described above, the final panel thickness can be achieved either by forming the panel at the desired thickness or by forming the panel at a greater thickness and sanding one or both planar faces to remove enough material to achieve the desired thickness. Sanding to thickness may in certain embodiments be preferred. For embodiments for which the cured mat is thicker than the desired panel, the cured board may be then sanded to a desired thickness after curing. This process is represented in FIG. 1 by block 24. The cured panel may require trimming, as shown in block 24, to remove rough edges consisting of unpressed material.

Figure 2:
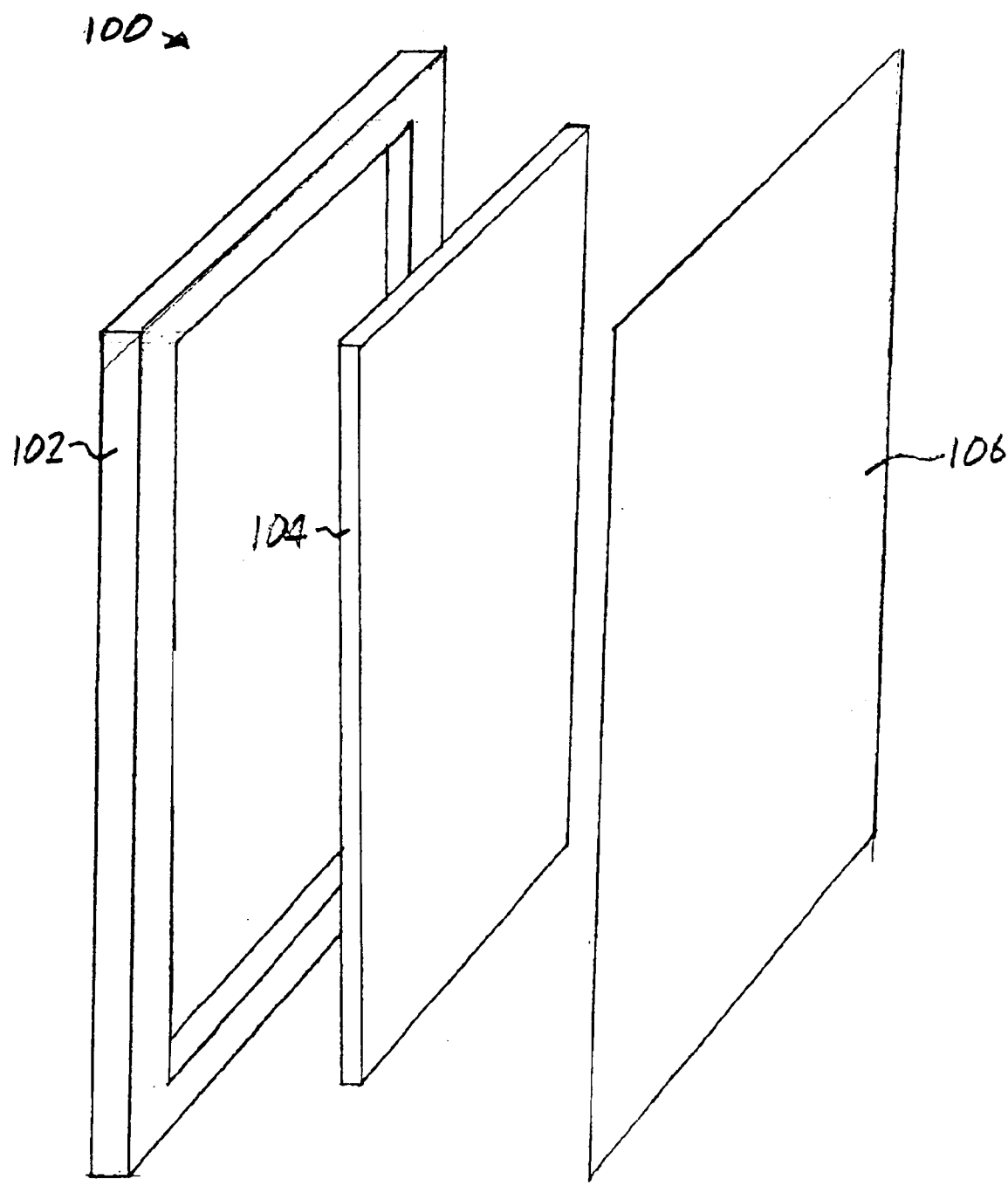
FIG. 2 is an exploded isometric view of a door assembly according to one embodiment of the present invention.

The panels thus manufactured can be used either independently, as represented by block 30, or incorporated into a fire-retardant door 100, as represented by blocks 26 and 28 and depicted in the exploded isometric view of FIG. 2. One embodiment of a panel 104 useful in fire-retardant doors 100 has a thickness of approximately 1.5 inches. Panels 104 used for general construction and other applications tend to be thinner, in certain embodiments approximately 0.1 inches to 0.25 inches. An additional general distinction between the rice straw panels 104 used for miscellaneous applications as compared to rice straw panels 104 used in fire doors 100 is that the rice straw panels 104 used in fire doors 100 may not require the addition of an organic phosphate or borates (zinc borate and/or boric acid), sodium silicates, aluminum trihydrate, or even rice hulls in order to achieve desired levels of fire retardancy.

As represented in FIG. 1 by block 26 and depicted in FIG. 2, the rice straw fire door cores 104 of the present invention can be assembled into doorframes 102 made of a fire-resistant material, for example, TECTONITE™ which is manufactured by and available from Warm Springs Composite Products of Warm Springs, Oreg., U.S.A. Any one of a variety of other materials commonly used in the construction industry in fire-resistant applications would also be suitable for manufacture of the doorframes 102. In other embodiments, the fire doors 100 may include one or more door skins 106 disposed on one or more surfaces of the fire door 100, as represented in FIG. 1 by block 28. The door skins 106 may be constructed from any of the materials commonly used in the construction of fire doors 100.

As manufactured and assembled as described above, certain embodiments of fire doors 100 according to the present invention have been demonstrated to exhibit a level of fire retardance sufficient to qualify as 45-minute, 60-minute and 90-minute doors, levels which are well above that traditionally associated with cellulose-based fire doors. Additionally, certain embodiments of fire retardant panels 104 according to the present invention have been shown to exhibit a level of performance sufficient to qualify as Class 1 fire retardant materials, which is higher than that traditionally associated with cellulose-based materials.

The embodiments and examples set forth herein are presented to best explain the present invention and its practical application and to thereby enable those skilled in the art to make and utilize the invention. Those skilled in the art, however, will recognize that the foregoing description and examples have been presented for the purpose of illustration and example only. Other variations and modifications of the present invention will be apparent to those of skill in the art, and it is the intent of the appended claims that such variations and modifications be covered. The description as set forth is not intended to be exhaustive or to limit the scope of the invention. Many modifications and variations are possible in light of the above teaching without departing from the spirit and scope of the following claims. It is contemplated that the use of the present invention can involve components having different characteristics. It is intended that the scope of the present invention be defined by the claims appended hereto, giving full cognizance to equivalents in all respects.

What is claimed is:

1. A fire resistant door comprising:
    an inner door core having a fire resistance rating of at least forty five minutes comprising milled rice straw fiber segments of between 0.125 and 1.5 inches after milling which size provides the at least forty-five minutes fire resistance rating in a cured resin matrix comprising between 2% and 10% by weight of the inner door core; and
    a doorframe comprising a fire-resistant material.

2. The door as recited in claim 1, wherein the inner door core further comprises a fire retardant material selected from the group consisting of one or more of: an organic phosphate, a borate, sodium silicate, aluminum trihydrate, rice hulls, and combinations thereof.

3. The door as recited in claim 1, further comprising one or more door skins.

4. The door as recited in claim 1, wherein the resin is selected from the group consisting of one or more of: phenol, polyisocyanate and a urea formaldehyde.

5. A fire resistant door comprising:
    an inner door core having a fire resistance rating of at least forty five minutes comprising milled rice straw fiber segments of at least about 0.125 inches after milling which size provides the at least forty-five minutes fire resistance rating in a matrix of cured resin comprising at least 2% and less than 10% of the weight of the inner door core; and
    a doorframe comprising a fire-resistant material.

6. The door as recited in claim 5, wherein the resin is selected from the group consisting of one or more of: phenol, polyisocyanate and of a urea formaldehyde.

7. The door as recited in claim 6, wherein the resin is selected from the group consisting of RUBINATE 1840™, a polymethylene polyphenylene ester of isocyanic acid, and PAPI-94™.

8. The door as recited in claim 6, wherein the fire resistant door includes one or more door skins disposed on one or more surfaces of the inner door core.

9. The door as recited in claim 5, wherein the inner door core further comprises a fire retardant material selected from the group consisting of one or more of: an organic phosphate, a borate, sodium silicate, aluminum trihydrate, rice hulls, and combinations thereof.

10. A fire resistant door comprising:
    an inner door core having a fire resistance rating of at least forty five minutes comprising milled rice straw fiber segments less than 3.0 inches after milling which size provides the at least forty-five minutes fire resistance rating in a matrix of cured resin selected from the group consisting of one or more of polyisocyanate, phenol or a urea formaldehyde, the cured resin comprising between 2% and 10% of the weight of the inner door core; and
    a doorframe comprising a fire-resistant material.

11. The door as recited in claim 10, wherein the cured resin is selected from the group consisting of RUBINATE 1840™, a polymethylene polyphenylene ester of isocyanic acid, and PAPI-94™.

12. The door as recited in claim 10, wherein the fire resistant door includes one or more door skins disposed on one or more surfaces of the inner door core.

13. The door as recited in claim 10, wherein the inner door core further comprises a fire retardant material selected from the group consisting of one or more of: an organic phosphate, a borate, sodium silicate, aluminum trihydrate, rice hulls, and combinations thereof.

* * * * *